(12) United States Patent
Arai et al.

(10) Patent No.: US 6,478,891 B1
(45) Date of Patent: Nov. 12, 2002

(54) RIBBON SHAPED MAGNET MATERIAL MAGNETIC POWDER AND RARE EARTH BONDED MAGNET

(75) Inventors: Akira Arai, Shimosuwa-machi (JP); Hiroshi Kato, Okaya (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/890,004

(22) PCT Filed: Nov. 24, 2000

(86) PCT No.: PCT/JP00/08314

§ 371 (c)(1),
(2), (4) Date: Jan. 2, 2002

(87) PCT Pub. No.: WO01/39215

PCT Pub. Date: May 31, 2001

(30) Foreign Application Priority Data

Nov. 25, 1999 (JP) ............................................ 11-334727

(51) Int. Cl.$^7$ ............................................... H01F 1/057
(52) U.S. Cl. ...................... 148/302; 148/301; 148/303; 252/62.54
(58) Field of Search ................................. 148/301, 302, 148/303; 252/62.54, 62.55

(56) References Cited

U.S. PATENT DOCUMENTS

| 5,725,792 A | | 3/1998 | Panchanathan |
| RE37,666 E | * | 4/2002 | Kanekiyo et al. ............ 148/302 |
| 6,401,799 B1 | * | 6/2002 | Arai et al. .................... 164/423 |

FOREIGN PATENT DOCUMENTS

| JP | 5-62813 | * | 5/1993 |
| JP | 7-54106 | | 2/1995 |
| JP | 10-340806 | | 12/1998 |
| JP | 11-233322 | | 8/1999 |
| WO | WO98/18141 | | 4/1998 |

OTHER PUBLICATIONS

O.V. Billoni, et al. "Dependence of the coercivity on the grain size in a FeNdB + αFe nanocrystalline composite with enhanced remanence", Journal of Magnetism and Magnetic Materials 187 (1998) 371–380.

A. Manaf, et al. "Microstructure analysis of nanocrystalline Fe–Nd–B ribbons with enhanced hard magnetic properties", Journal of Magnetism and Magnetic Materials 128 (1993) pp. 307–312.

* cited by examiner

Primary Examiner—John Sheehan
(74) Attorney, Agent, or Firm—Harness, Dickey & Pierce, P.L.C.

(57) ABSTRACT

The ribbon shaped magnet material (quenched ribbon 8) according to the present invention is obtained by ejecting a molten liquid 6 of an alloy containing rare earth elements and transition metals from a nozzle 3, and quenching the molten liquid allowing it to collide with a circumference face 53 of a cooling roll 5. The micostructure of the quenched ribbon comprises. soft magnetic phases and hard magnetic phases in adjoining relation to one another. Crystal grain sizes of the quenched ribbon 8 preferably satisfy the following equations [1] and [2], and preferably satisfy at least one of the following equations [3] and [4]:

$$D1s/D1h \leq 0.9 \quad [1]$$

$$D2s/D2h \leq 0.8 \quad [2]$$

$$0.5 \leq D1h/D2h \leq 1 \quad [3]$$

$$0.5 \leq D1s/D2s \leq 1 \quad [4]$$

wherein D1h and D1s denote the mean crystal grain sizes of the hard magnetic phase and soft magnetic phase, respectively, in the vicinity of the roll contact surface 81, and D2h and D2s denote the mean crystal grain sizes of the hard magnetic phase and soft magnetic phase, respectively, in the vicinity of the free surface 82.

45 Claims, 5 Drawing Sheets

RIBBON SHAPED MAGNET MATERIAL MAGNETIC POWDER AND RARE EARTH BONDED MAGNET

BACKGROUND OF THE INVENTION

The present invention relates to a ribbon shaped magnet material, a magnetic powder and a rare earth bonded magnet.

BACKGROUND OF THE INVENTION

A bonded magnet prepared by bonding a magnetic powder with a bonding resin is used for motors and various actuators by taking advantage of its wide degree of freedom of configuration.

Magnet materials constituting the bonded magnet described above are manufactured by, for example, a quenching method using a quenching type ribbon manufacturing apparatus. The manufacturing method is called a single roll method when the quenching type ribbon manufacturing apparatus comprises a single cooling roll.

In the single roll method, a thin foil (ribbon) of a magnet material, or a quenched ribbon, is continuously formed by the steps comprising heating and melting a magnet material with a prescribed alloy composition, ejecting the molten liquid from a nozzle to allow it to collide with the circumference surface of a cooling roll rotating relative to the nozzle, and quenching and solidifying the molten liquid by allowing it to contact the circumference face. The quenched ribbon is pulverized into a magnetic powder, and a bonded magnet is manufactured using this magnetic powder.

The cooling roll used in the single roll method is generally composed of a copper alloy or an iron alloy. Some cooling rolls comprise metal or metal alloy surface layers formed by, for example, Cr plating on the circumference face of the cooling roll for improving durability.

However, since the circumference face of the cooling roll as described above is composed of a metal having a high heat conductivity, a difference in the cooling rate is caused between the roll contact surface (the surface at the side in contact with the circumference face of the cooling roll) and free surface (the surface opposed to the roll contact surface) of the quenched ribbon, resulting in a large difference of the microstructure (for example, the difference of the crystal grain size) between the two surfaces. Accordingly, the magnetic powders manufactured by pulverizing the ribbon involve heterogeneous magnetic characteristics among each lot of the magnetic powder. Therefore, satisfactory magnetic characteristics cannot be obtained when a bonded magnet is manufactured from these magnetic powders.

Accordingly, the object of the present invention is to provide a ribbon shaped magnet material, magnetic powder and rare earth bonded magnet that are able to provide a highly reliable magnet having excellent magnetic characteristics.

DISCLOSURE OF THE INVENTION (1) A first ribbon shaped magnet material according to the present invention is obtained by allowing a molten liquid of an alloy containing rare earth elements and transition metals to contact a cooling member, the microstructure comprising a composite microstructure having soft magnetic phases and hard magnetic phases, wherein D1h, D1s, D2h and D2s satisfy the following equations:

$$D1s/D1h \leq 0.9 \quad [1]$$

$$D2s/D2h \leq 0.8 \quad [2]$$

where D1h denotes a mean grain size of the hard magnetic phase in the vicinity of a first surface as a surface that has been in contact with the cooling member, D1s denotes a mean grain size of the soft magnetic phase in the vicinity of the first surface, D2h denotes a mean grain size of the hard magnetic phase in the vicinity of a second surface as an opposed surface to the first surface, and D2s denotes a mean grain size of the soft magnetic phase in the vicinity of the second surface.

(2) The ribbon shaped magnet material preferably satisfies at least one of the equations [3] and [4]:

$$0.5 \leq D1h/D2h \leq 1 \quad [3]$$

$$0.5 \leq D1s/D2s \leq 1 \quad [4]$$

(3) A second ribbon shaped magnet material according to the present invention is obtained by allowing a molten liquid of an alloy containing rare earth elements and transition metals to contact a cooling member, the microstructure comprising a composite microstructure having soft magnetic phases and hard magnetic phases, wherein D1h, D1s, D2h and D2s satisfy the following equations:

$$0.5 \leq D1h/D2h \leq 1 \quad [3]$$

$$0.5 \leq D1s/D2s \leq 1 \quad [4]$$

where D1h denotes a mean grain size of the hard magnetic phase in the vicinity of a first surface as a surface that has been in contact with the cooling member, D1s denotes a mean grain size of the soft magnetic phase in the vicinity of the first surface, D2h denotes a mean grain size of the hard magnetic phase in the vicinity of a second surface as an opposed surface to the first surface, and D2s denotes a mean grain size of the soft magnetic phase in the vicinity of the second surface.

(4) Preferably, at least one of D1s and D2s is 75 nm or less.

(5) Preferably, at least one of D1h and D2h is 75 nm or less.

(6) D1h, D2h, D1s and D2s are preferably determined by measurements of X-ray diffraction.

(7) The alloy composition preferably contains B (boron)

(8) The alloy composition preferably contains Al (aluminum).

(9) Preferably, the alloy composition is represented by $R_x(Fe_{1-y}Co_y)_{100-x-z-w}B_zAl_w$ (wherein R denotes at least one of rare earth elements, and x is in the range of 7.1 to 9.9 atomic percentage (at %), y is in the range of 0 to 0.30, z is in the range of 4.6 to 6.8 at %, and w is in the range of 0.02 to 1.5 at %).

(10) R is preferably a rare earth element mainly comprising Nd and/or Pr.

(11) R includes Pr with a preferable proportion of 5 to 75% relative to the total content of R.

(12) R includes Dy with a preferable proportion of 14% or less relative to the total content of R.

(13) Preferably, the ribbon shaped magnet material is subjected to a heat treatment after contacting the cooling member.

(14) It is preferable that the cooling member is a cooling roll.

(15) The magnetic powder according to the present invention is obtained by pulverizing the ribbon shaped magnet material.

(16) Preferably, at least one time of heat treatment is applied to the magnetic powder in the manufacturing process or after manufacturing.

(17) The magnetic powder preferably has a mean particle size of 0.5 to 150 μm.

(18) The rare earth bonded magnet is prepared by bonding the magnetic powder with a binding resin.

(19) Preferably, the rare earth bonded magnet contains 75 to 95.5 wt % of the magnetic powder.

(20) It is preferable that the rare earth bonded magnet has a coercive force $H_{CJ}$ of 320 to 720 kA/m.

(21) It is preferable that the rare earth bonded magnet has a magnetic energy product $(BH)_{max}$ of 60 kJ/m$^2$.

(22) It is preferable that the rare earth bonded magnet has an absolute value of the irreversible flux loss (initial flux loss) of 5.7% or less.

(23) Preferably, the rare earth bonded magnet is subjected to multipolar magnetization or magnetized as a multipolar magnet.

(24) Preferably, the rare earth bonded magnet is used for a motor.

BEST MODE FOR CARRYING OUT THE INVENTION

Embodiments of the ribbon shaped magnet material, magnetic powder and rare earth bonded magnet using the magnet material will be described in detail hereinafter.

Materials having excellent magnetic characteristics are preferably used in the thin foil (ribbon) shaped magnet material and magnetic powder according to the present invention.

These materials include an alloy containing R (R denotes at least one of the rare earth elements containing Y) and TM (TM denotes at least one of the transition metals), particularly an alloy containing R (R denotes at least one of the rare earth elements containing Y), TM (TM denotes at least one of the transition metals) and B (boron). The material preferably has the following compositions [1] to [3]:

(1) a basic composition containing rare earth elements mainly comprising Sm and transition metals mainly comprising Co (referred to as a Sm—Co based alloy hereinafter);

(2) a basic composition containing R (R denotes at least one of the rare earth elements), transition metals (TM) mainly comprising Fe, and B (referred to as a R—TM—B based alloy hereinafter); and (3) a basic composition containing rare earth elements mainly comprising Sm, transition metals mainly comprising Fe, and interstitial elements mainly comprising N (referred to as a Sm—Fe—N based alloy hereinafter).

Representative examples of the Sm—Co based alloy include SmCo$_5$ and Sm$_2$Tm$_{17}$ (TM denotes a transition metal).

Representative examples of the R—Fe—B based alloy include a Nd—Fe—B based alloy, a Pr—Fe—B based alloy, a Nd—Pr—Fe—B based alloy, a Nd—Dy—Fe—B based alloy, a Ce—Nd—Fe—B bases alloy, a Ce—Pr—Nd—Fe—B based alloy and those prepared by substituting a part of Fe in these alloys with other transition metals such as Co and Ni.

Representative examples of the Sm—Fe—N based alloy include a Sm—Zr—Fe—Co—N based alloy having principal phases of Sm$_2$Fe$_{17}$N$_3$ or TbCu$_7$ type phases prepared by nitriding a Sm$_2$Fe$_{17}$ alloy.

The rare earth elements include Y, La, Ce, Pr, Nd, Pm, Sm, Eu, Gd, Tb, Dy, Ho, Er, Tm, Yb, and Lu, and a mish metal, and one or plural elements may be contained in the alloy. The transition metals include Fe, Co and Ni, and one or a plurality of them may be included.

More preferable compositions of the magnet material will be described hereinafter.

Particularly preferable alloy compositions in the present invention are represented by $R_x(Fe_{1-y}Co_y)_{100-x-z-w}B_zAl_w$ (wherein R denotes at least one of the rare earth elements, and x is in the range of 7.1 to 9.9 atomic percentage (at %), y is in the range of 0 to 0.30, z is in the range of 4.6 to 6.8 at %, and w is in the range of 0.02 to 1.5 at %).

R (rare earth element) includes Y, La, Ce, Pr, Nd, Pm, Sm, Eu, Gd, Tb, Dy, Ho, Er, Tm, Yb, and Lu, and a mish metal, and one or plural elements may be contained in the maget material.

The content of R is preferably 7.1 to 9.9 at %. A sufficient coercive force cannot be obtained when the content of R is less than 7.1 at %, and the coercive force is not improved even by adding, for example, Al. When the content of R exceeds 9.9 at %, on the other hand, a sufficient magnetic flux density cannot be obtained because magnetic potential decreases.

R is preferably a rare earth element mainly comprising Nd and/or Pr, because these rare earth elements are effective for enhancing saturation magnetization of the hard magnetic phase constituting the composite microstructure (particularly nano-composite microstructure) besides exhibiting good coercive force as a magnet.

R includes Pr, and the proportion of Pr is preferably 5 to 75%, more preferably 20 to 60%, relative to the total content of R. The content of Pr in this range enables coercive force and squareness ratio to be improved without significant decrease of remanent magnetic flux density.

R also includes Dy, and the proportion of Dy is preferably 14% or less relative to the total content of R. The content of Dy in this range enables coercive force to be improved without remarkable decrease of remanent magnetic flux density, besides enabling temperature characteristics (heat stability) to be improved.

Co is a transition metal having similar characteristics to Fe. While Curie temperature increases and temperature characteristics are improved by adding Co (substituting a part of Fe with Co), both of the coercive force and magnetic flux density tend to decrease when the substitution ratio of Fe with Co exceeds 0.30. A substitution ratio of Fe with Co in the range of 0.05 to 0.20 is more preferable because temperature characteristics as well as magnetic flux density are improved.

B (boron) is an element effective for obtaining high magnetic characteristics, and preferable content of boron is in the range of 4.6 to 6.8 at %. When the content of B is less than 4.6%, squareness ratio in the B-H (J-H) loop becomes poor. When the content of B exceeds 6.8%, on the other hand, non-magnetic phases are so increased that the magnetic flux density decreases.

Al is an element advantageous for improving coercive force, and the effect for improving the coercive force becomes evident particularly in the range of 0.02 to 1.5 at %. Squareness ratio and magnetic energy product are also improved in this composition range following the improvement of coercive force. Heat resistance and corrosion resistance are also improved. However, the effect exerted by adding aluminum is quite small in the range of the content of R of less than 7.1 at % as described above. Magnetization decreases when the content of Al exceeds 1.5 at %.

Elements such as Al, Cu, Ga, Si, Ti, V, Ta, Zr, Nb, Mo, Hf, Ag, Zn, P, and Ge may be added, if necessary, in the magnet material according to the present invention in order to improve such magnetic characteristics such as coercive force and magnetic energy product, or to improve heat resistance and corrosion resistance.

The magnet material comprises a microstructure (a composite microstructure) in which soft magnetic phases and hard magnetic phases fexis together.

Figure 1:
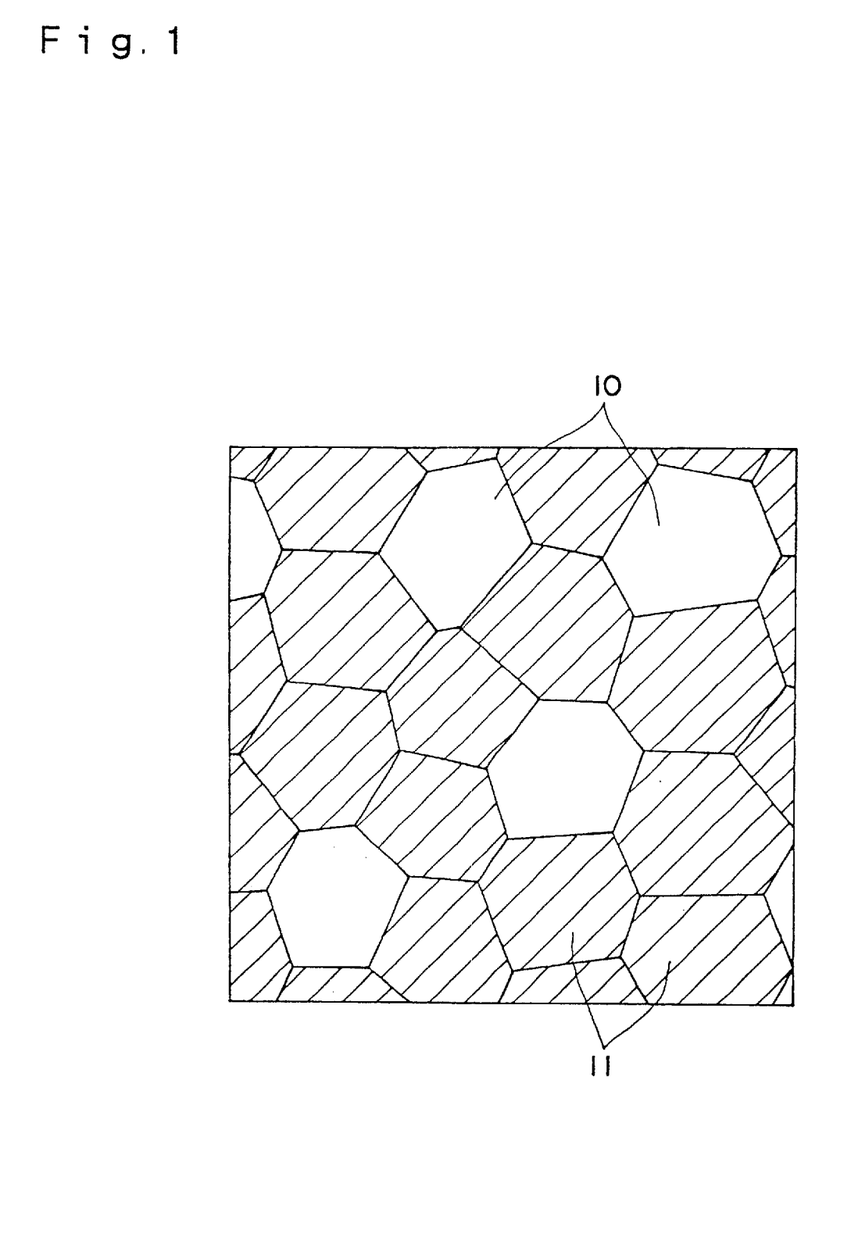
FIG. 1 illustrates one example of the nano-composite microstructure (macro microstructure) in the magnetic powder according to the present invention.
Figure 2:
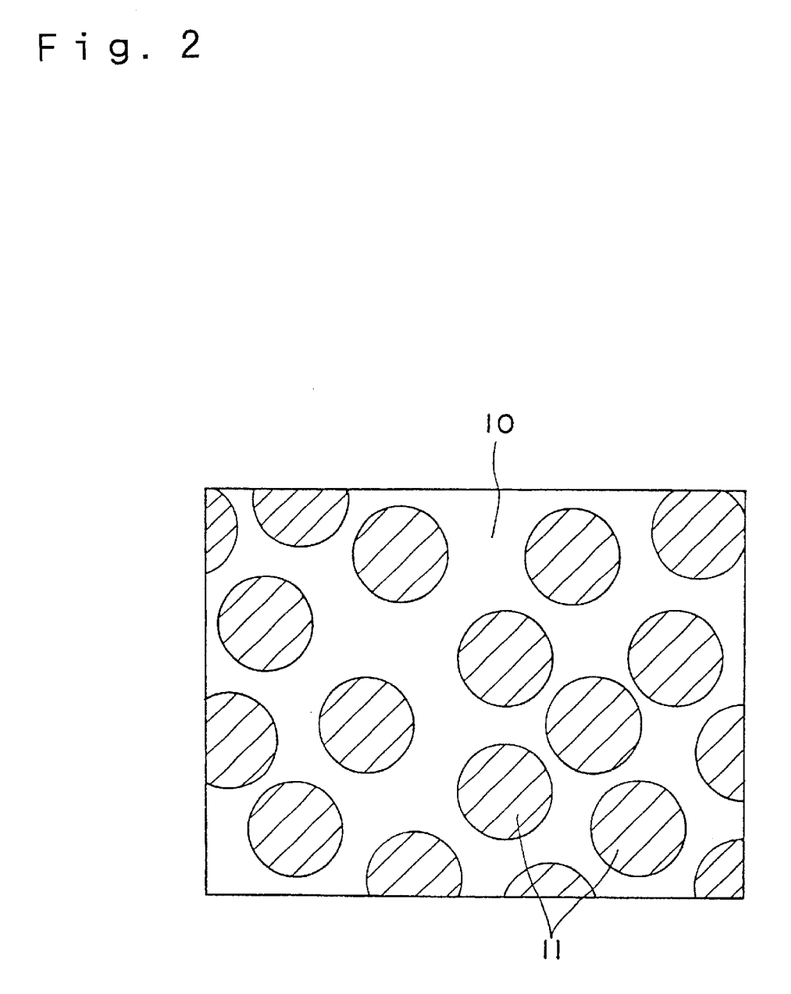
FIG. 2 illustrates one example of the nano-composite microstructure (macro microstructure) in the magnetic powder according to the present invention.
Figure 3:
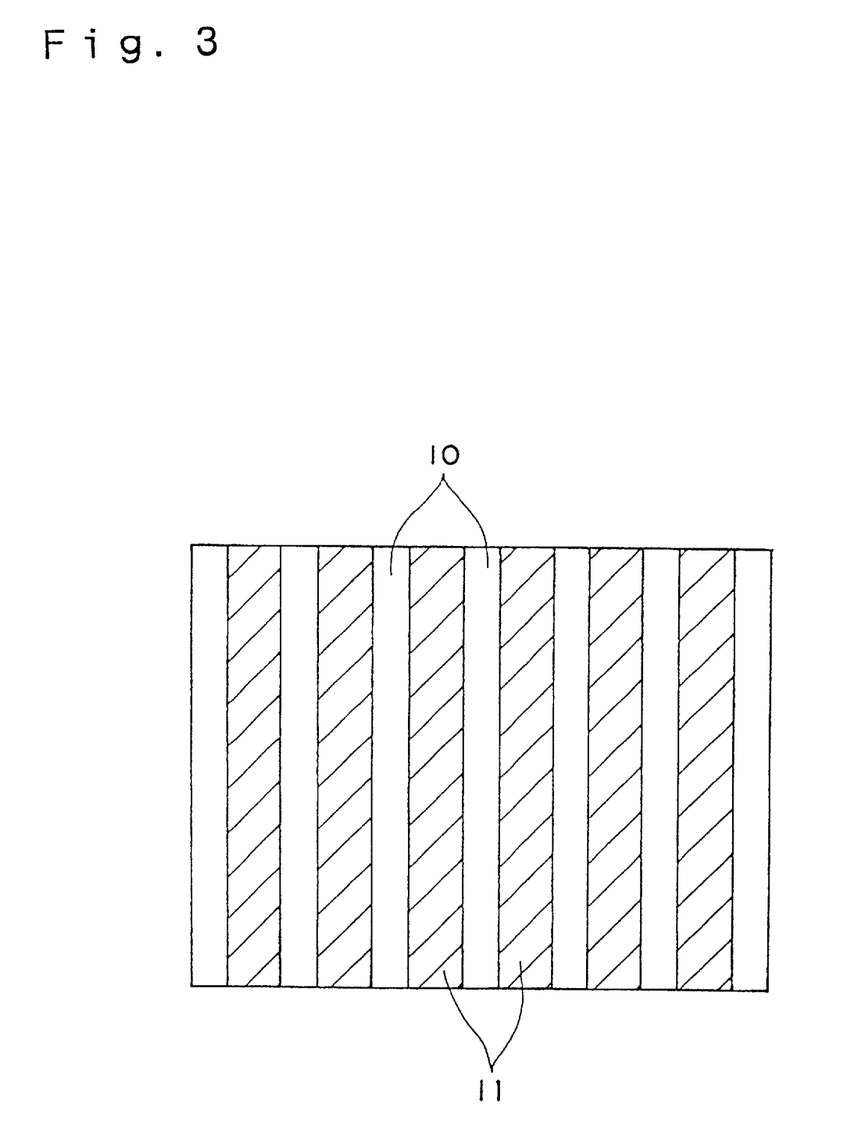
FIG. 3 illustrates one example of the nano-composite microstructure (macro microstructure) in the magnetic powder according to the present invention.

The soft magnetic phase 10 and hard magnetic phase 11 coexistent together in a pattern (model) in this microstructure (the composite microstructure) as shown in FIGS. 1, 2, and 3, and the thickness and grain size in each phase are in a nanometer level (for example 1 to 100 nm). The soft magnetic phase 10 and the hard magnetic phase 11 are in an adjoining relation to one another to generate a magnetic exchange interaction. The patterns shown in FIGS. 1 to 3 are only examples, and the patterns are not restricted thereto but the relation between the soft magnetic phase 10 and the hard magnetic phase 11 may be reversed, for example, in the patterns shown in FIG. 2.

Since the direction of magnetization of the soft magnetic phase readily changes by the action of an external magnetic field, the magnetization curve of the overall system assumes a "serpentine curve" having a step at the second quadrant. However, magnetization of the soft magnetic substance is sufficiently strongly constrained by coupling with magnetization of the surrounding hard magnetic substance to behave as if the entire system is a hard magnetic substance, when the size of the soft magnetic phase is as small as several tens of nanometers or less.

The magnet involving such composite microstructures (nano-composite microstructures) mainly comprises the features described in 1) to 5) below.

(1) Magnetization reversibly springs-back at the second quadrant in the B-H diagram (J-H diagram) (the magnet is called a "spring magnet" in this sense).

(2) The magnet is readily magnetized, or can be magnetized in a relatively low magnetic field.

(3) Temperature dependency of magnetic characteristics is small as compared with the magnet solely involving the hard magnetic phase.

(4) The magnet has a small time-dependent change of magnetic characteristics.

(5) No deterioration of magnetic characteristics is observed by pulverization.

The hard magnetic phase and soft magnetic phase in the R—TM—B based alloy comprises the following phases:

Hard magnetic phase: $R_2TM_{14}B$ phase (TM denotes Fe, or Fe and Co), or $R_2TM_{14}BQ$ phase (Q denotes at least one of Al, Cu, Ga, Si, Ti, V, Ta, Zr, Nb, Mo, Hf, Ag, Zn, P and Ge); and Soft magnetic phase: TM (in particular α-Fe or α-(Fe, Co)), an alloy phase of TM and Q, or a compound phase of TM and B.

The method for manufacturing the ribbon shaped magnet material according to the present invention will be described hereinafter.

A ribbon shaped magnet material (called as a quenched thin foil or ribbon) is manufactured by allowing a molten magnet material (an alloy) to contact a cooling member to solidify. An example of the method will be described below.

Figure 4:
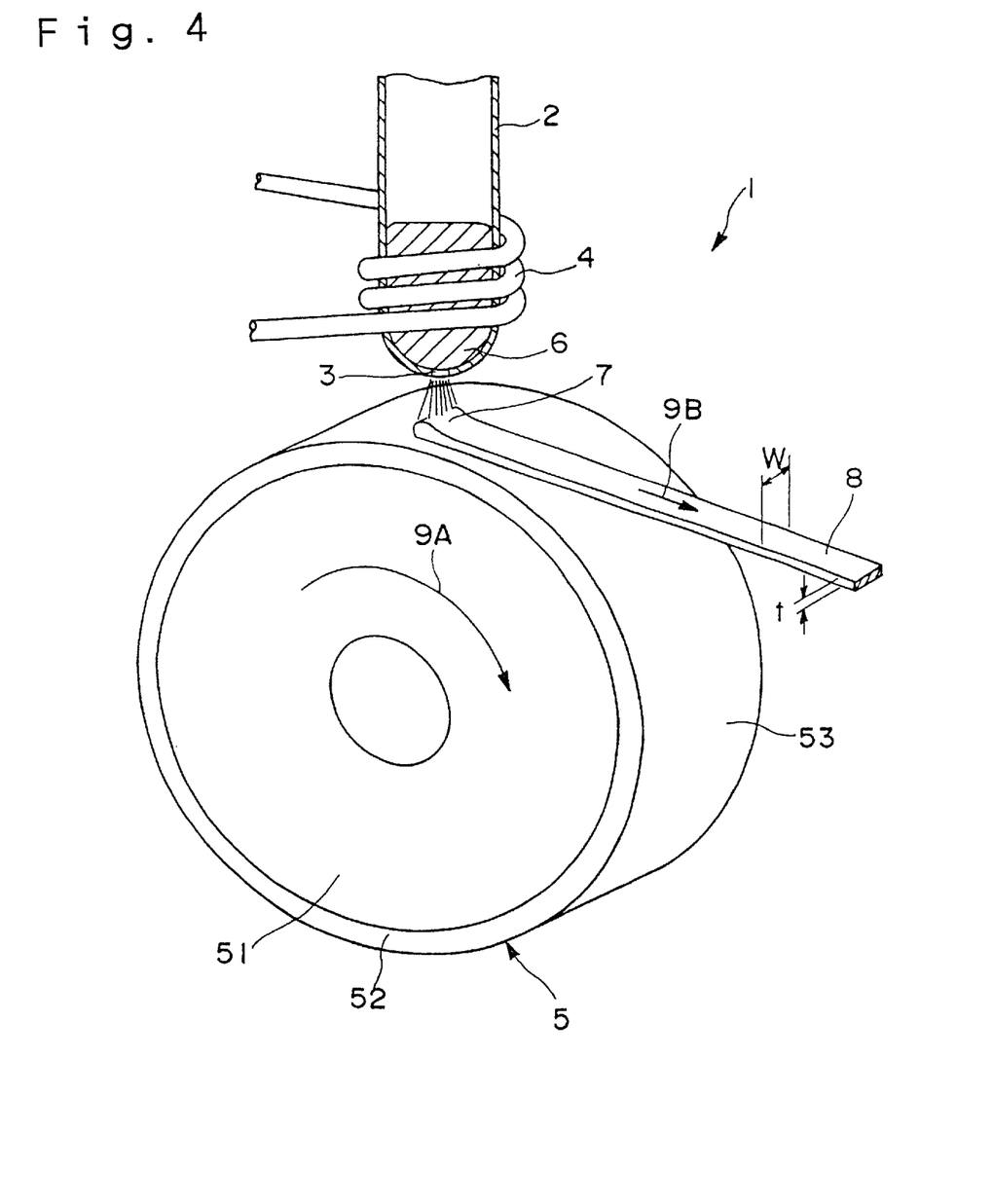
FIG. 4 is a perspective view showing one example of the constitution of the apparatus for manufacturing the magnet material (quenching type ribbon manufacturing apparatus).
Figure 5:
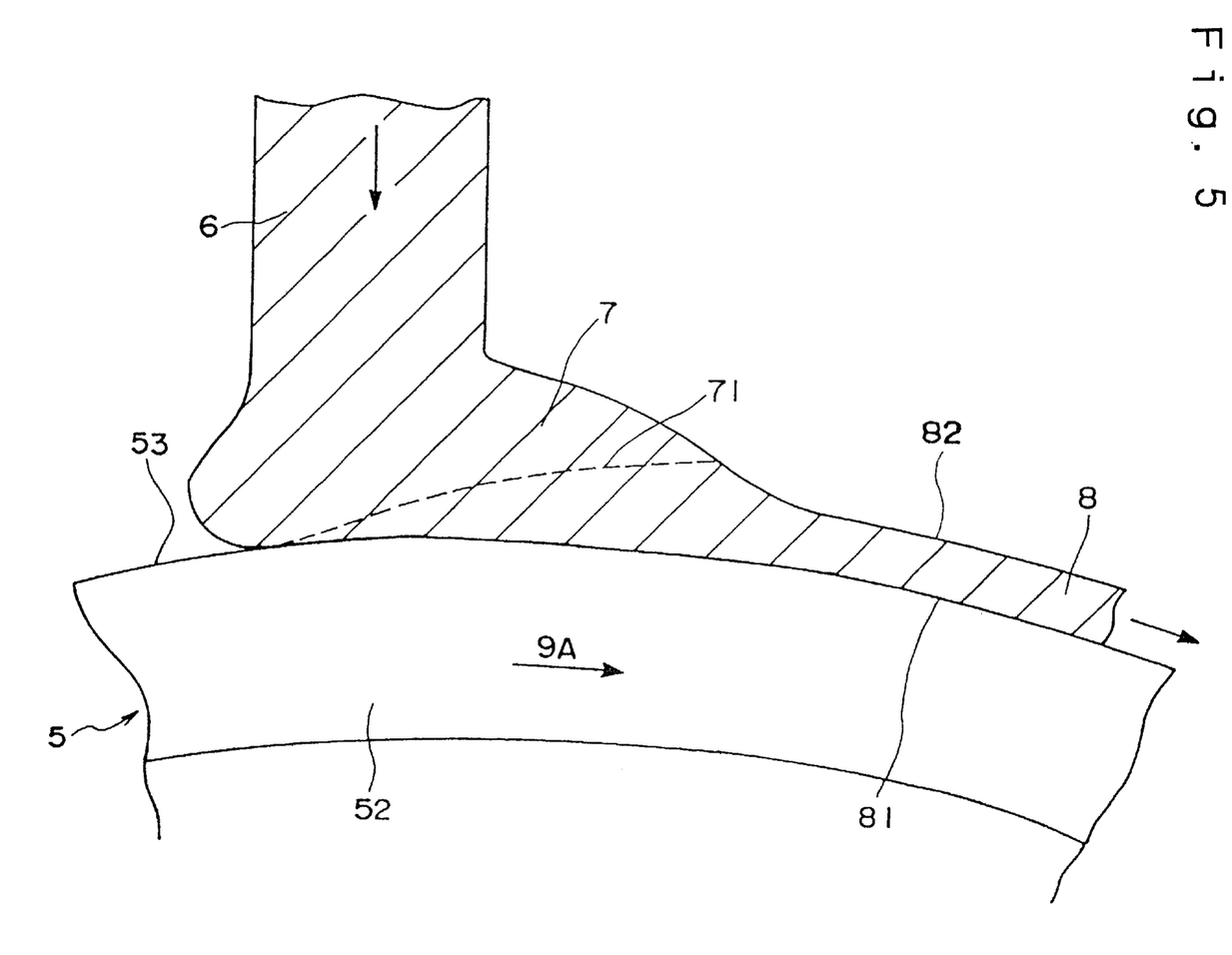
FIG. 5 is a cross sectional side view showing the state in the vicinity of a collision part of the molten liquid onto the cooling roll in the apparatus shown in FIG. 4.

FIG. 4 is a perspective view showing an example of the construction of an apparatus for manufacturing a magnet material by a quenching method using a single roll (a quenching type ribbon manufacturing apparatus), and FIG. 5 is a cross sectional side view showing the state in the vicinity of a collision part of the molten liquid onto the cooling roll in the apparatus shown in FIG. 4.

As shown in FIG. 4, the quenching type ribbon manufacturing apparatus 1 comprises a cylinder 2 in which the magnet material is housed, and a cooling roll 5 (a cooling member) rotating toward the arrow 9A in the drawing relative to the cylinder 2. A nozzle (an orifice) 3 for ejecting the molten liquid of the magnet material (an alloy) is formed at the lower end of the cylinder 2.

A heating coil 4 is provided at the outer circumference of the nozzle 3 of the cylinder 2, and the magnet material in the cylinder 2 is melted by heating (induction heating) the inside of the cylinder 2 by impressing a microwave onto the coil 4.

The cooling roll 5 is composed of a base 51 and a surface layer 52 constituting the circumference face 53 of the cooling roll 5.

The same material as that of the surface layer 52 may be used for constructing material of the base 51 to integrate them together, or the material for the base may be different from that of the surface layer 52.

While the constitution material of the base 51 is not particularly restricted, it is preferably made of a metallic material having a high heat conductivity such as copper or a copper alloy, in order to more rapidly dissipate the heat on the surface layer 52.

The surface layer 52 preferably comprises a material having a heat conductivity similar to or lower than the base 51. Examples of the surface layer 52 include a metallic film or metal oxide layer of, for example, Cr, or a ceramic.

The ceramic available includes an oxide based ceramic such as Al2O3, SiO2, TiO2, Ti2O3, ZrO2, Y2O3, barium titanate and strontium titanate, a nitride based ceramic such as AlN, Si3N4, TiN and BN, a carbide based ceramic such as SiC, ZrC, Al4C3, CaC2, and WC, or a composite ceramic as an arbitrary combination of two or more of them.

The quenching type ribbon manufacturing apparatus 1 as described above is placed in a chamber (not shown), and is operated while the chamber is filled with an atmospheric gas such as an inert gas and the like. The preferable atmospheric gas comprises an inert gas such as argon gas, helium gas and nitrogen gas for preventing the quenched ribbon 8 from being oxidized.

The magnet material (alloy) is placed in the cylinder 2 of the quenching type ribbon manufacturing apparatus 1 to melt the material by heating with the coil 4. The molten liquid 6 is discharged out of the nozzle 3, and collides with the circumference face 53 of the cooling roll 5. After forming a puddle (a basin) 7, the molten liquid 6 is cooled and solidifies by being pulled by the circumference face 53 of the rotating cooling roll 5 to continuously or intermittently form the quenched ribbon 8. The roll contact surface 81 of the quenched ribbon 8 formed as described above soon leaves the circumference face 53, and advances toward the direction of the arrow 9B shown in FIG. 4. The solidification interface 71 of the molten liquid is indicated by the dotted line in FIG. 5.

While the favorable range of the circumference speed of the cooling roll 5 differs depending on the composition of the molten liquid of the alloy, and wettabilty of the circumference face 53 against the molten liquid, the preferable speed is usually 1 to 60 m/sec, and more preferably 5 to 40 m/sec. When the circumference speed of the cooling roll 5 is too slow, the thickness t of the quenched ribbon becomes large depending on the volume flow rate (the volume of the molten liquid discharged in unit time) of the quenched ribbon 8, showing a tendency to increase the crystal grain size. When the circumference speed of the cooling roll 5 is too rapid, on the contrary, most of the composition of the quenched ribbon turns out to be amorphous phases. Consequently, improvement of the magnetic characteristics cannot be expected in both cases, even by applying a heat treatment thereafter.

At least one time of heat treatment may be applied to the quenched ribbon 8 for, for example, accelerating recrystallization of the amorphous phase or for homogenizing the microstructure. The heat treatment condition is, for example, 0.5 to 300 minutes at 400 to 900° C.

The heat treatment is preferably applied under a reduced pressure (for example 1×10−1 to 1×10−6 Torr), or in a non-oxidizing atmosphere such as in an inert gas atmosphere such as nitrogen gas, argon gas or helium gas.

The quenched ribbon (thin foil of the magnet material) 8 obtained in the manufacturing method above contains fine crystalline phases or fine crystals in the amorphous phase to exhibit excellent magnetic characteristics.

It is preferable that the equation [1] and [2] below are satisfied in the quenched ribbon 8 obtained as described above, wherein D1h represents the mean crystal grain size of the hard magnetic phase (the principal phase) in the vicinity of the roll contact surface (the first surface at the side making contact with the cooling member) 81, D1s represents the mean crystal grain size of the soft magnetic phase in the vicinity of the roll contact surface 81, D2h represents the mean crystal grain size of the hard magnetic phase in the vicinity of the free surface 82, and D2s represents the mean crystal grain size of the soft magnetic phase in the vicinity of the free surface 82.

$$D1s/D1h \leq 0.9 \quad [1]$$

$$D2s/D2h \leq 0.8 \quad [2]$$

Excellent magnetic characteristics can be obtained by suppressing inversion of magnetization of the soft magnetic phase in a low magnetic field due to the interaction between the soft magnetic phase and the hard magnetic phase as a principal phase among the crystal grains at the roll contact surface 81 side, when the relation of D1s/D1h≦0.9 is valid.

When the relation of D2s/D2h≦0.8 is valid, on the other hand, excellent magnetic characteristics can be also obtained by suppressing inversion of magnetization of the soft magnetic phase due to the interaction between crystal grains in the soft magnetic phase and in the hard magnetic phase as a principal phase at the free surface 82 side.

A magnet material having uniform and excellent magnetic characteristics as a whole is obtained by satisfying the equations (1) and (2). In more detail, a high magnetic energy product $(BH)_{max}$ is obtained when the magnetic powder is manufactured from the quenched ribbon 8, and when a bonded magnet is subsequently manufactured using the magnetic powder. Reliability of the magnet is also improved by improving the squareness ratio in the hysteresis loop, and consequently reducing the absolute value of the irreversible flux loss coefficient.

The upper limit of D1s/D1h (0.9) is different from the upper limit of D2s/D2h (0.8). The crystal grain size in both the hard magnetic phase and soft magnetic phase tends to be larger at the free surface 82 side than at the roll contact surface side 81. For elucidating the reason, the inventors of the present invention found that the increasing tendency of the crystal grain size is different between the hard magnetic phase and soft magnetic phase. Therefore, the upper limit of the crystal grain size for exhibiting high magnetic characteristics was determined from repeated experiments.

As a result, it was found that the more preferable upper limit of D1s/D1h is 0.8 and the more preferable upper limit of D2s/D2h is 0.75. These values permit higher magnetic characteristics to be obtained.

Preferably, at least one of the following equations [3] and [4] is satisfied and, more preferably, both equations are satisfied.

$$0.5 \leq D1h/D2h \leq 1 \quad [3]$$

$$0.5 \leq D1s/D2s < 1 \quad [4]$$

Since the crystal grain size shows a tendency to be larger at the free surface 82 side than at the roll contact surface 81 side in both the hard magnetic phase and soft magnetic phase, the upper limits of both of D1h/D2h and D1s/D2s are determined to be 1.

The difference of the crystal grain size in the hard magnetic phase and in the soft magnetic phase becomes smaller on the roll contact surface 81 and on the free surface 82, respectively, when D1h/D2h or D1s/D2s is 0.5 or more. Consequently, magnetic characteristics are averaged to enable excellent magnetic characteristics to be obtained. In more detail, a high magnetic energy product $(BH)_{max}$ is obtained besides improving the squareness ratio in the hysteresis loop, when the magnetic powder is manufactured from the quenched ribbon 8 followed by manufacturing the bonded magnet using the magnetic powder. As a result, reliability of the magnet is improved since the absolute value of the irreversible flux loss is reduced.

While the values of D1s and D2s are not particularly restricted, it is preferable that at least one of D1s or D2s (preferably both of them) is 75 nm or less, more preferably 50 nm or less. When the values are within the range above, the remanent magnetic flux density and squareness ratio are particularly improved.

While the values of D1h and D2h are not particularly restricted, it is preferable that at least one of D1h or D2h (preferably both of them) is 75 nm or less, more preferably 50 nm or less. When the values are within the range above, the coercive force and squareness ratio are particularly improved.

While the methods for measuring D1s, D1h, D2s, and D2h are not particularly restricted, the X-ray diffraction method as shown below may be used for the measurements.

Diffraction peaks of the hard magnetic phase and soft magnetic phase are measured by X-ray diffraction from the roll contact surface 81 and free surface 82 of the quenched ribbon 8. Then, diffraction angles 2θ and half widths β of the diffraction peaks from a specified diffraction face of the hard magnetic phase and from a specified diffraction face of the soft magnetic phase are determined, respectively, with respect to the roll contact surface 81 and free surface 82 of the quenched ribbon 8. The crystal grain sizes D (D1s, D1h, D2s and D2h) are determined by substituting 2θ and β with the measured values in the following equation [5].

$$D = 0.9\lambda / \beta \cdot \cos\theta \, (\lambda = 0.154 \text{ nm}) \quad [5]$$

The crystal grain size of the hard magnetic phase and soft magnetic phase can be simply and accurately determined by the X-ray diffraction method.

While the single roll method using a cooling roll as a cooling member was hitherto described, the present invention is not restricted thereto, but may be applied to other manufacturing methods using different cooling members such as a rotating disk method or a melt-extraction method.

The pulverization method is not particularly restricted, but various pulverizing and crushing apparatus such as a ball mill, vibration mill, jet mill and pin mill may be used. Pulverization and crushing may be carried out in vacuum or under a reduced pressure (for example $1 \times 10^{-1}$ to $1 \times 10^{-6}$ Torr), or in a non-oxidizing atmosphere in an inert gas such as nitrogen gas, argon gas and helium gas in order to prevent oxidation.

While the mean particle size of the magnetic powder is not particularly restricted, a particle size range of 0.5 to 150 μm is preferable considering prevention of oxidation of the magnetic powder and deterioration of magnetic characteristics due to crushing, when the powder is used for manufacturing an isotropic rare earth bonded magnet as will be described hereinafter. The particle size range is more preferably 0.5 to 80 μm, and most preferably 1 to 50 μm.

It is preferable that the particle size distribution of the magnetic powder is heterogeneous (widely distributed) to some extent in order to be favorable for molding the bonded magnet. Good molding property allows the void ratio of the bonded magnet obtained to be reduced, consequently enabling the density and mechanical strength of the bonded magnet to be enhanced even when the content of the magnetic powder in the bonded magnet is constant, in addition to further improving the magnetic characteristics.

The magnetic powder obtained may be subjected to heat treatment, in order to remove strain introduced by crushing. The heat treatment may be carried out, for example, at a temperature range of 350 to 850° C. for 0.5 to 300 minutes.

The heat treatment is preferably applied under a reduced pressure (for example $1 \times 10^{-1}$ to $1 \times 10^{-6}$ Torr), or in a non-oxidizing atmosphere such as in an inert gas atmosphere such as nitrogen gas, argon gas or helium gas, in order to prevent oxidation.

The magnetic powder prepared for manufacturing the bonded magnet obtained as described above has a good bonding ability (wettability with a resin). Accordingly, the bonded magnet has a high mechanical strength, and good heat stability (heat resistance) and corrosion resistance. Therefore, the magnetic powder as hitherto described is suitable for manufacturing the bonded magnet.

[Bonded magnet and Manufacturing of Bonded magnet]

The rare earth bonded magnet (simply called a bonded magnet hereinafter) will be described hereinafter.

The bonded magnet according to the present invention is manufactured by bonding the magnetic powder with a bonding resin.

Either a thermoplastic resin or a heat curable resin may be used for the binder resin (binder).

Examples of the thermoplastic resin include polyamides (nylon 6, nylon 46, nylon 66, nylon 610, nylon 612, nylon 11, nylon 12, nylon 6–12 and nylon 6–66); liquid crystal polymers such as thermoplastic polyimides and aromatic polyesters; polyolefins such as polyphenylene oxide, polyphenylene sulfide, polyethylene, polypropylene and ethylene-vinyl acetate copolymer; modified polyolefins; polyesters such as polycarbonate, polymethyl methacrylate; polyethylene terephthalate and polybutylene terephthalate; polyether; polyether ether ketone; polyether imide; polyacetal; or copolymers, blended polymers and polymer alloys thereof. One of them, or a mixture of two or more of them may be used.

Among the polymers described above, the polymers mainly comprising polyamide are preferable from the point of excellent molding ability and high mechanical strength, and the liquid crystal polymer and polyphenylene sulfide are preferable from the point of improving the heat resistance. These thermoplastic resins have good compatibility for kneading with the magnetic powder.

These thermoplastic resins have advantages of enabling a wide range of selection such that emphasizing molding ability or emphasizing heat resistance and mechanical strength depending on the kind and degree of copolymerization of the polymers.

Examples of the heat curable polymers include, on the other hand, various epoxy resins such as bisphenol type, noborac type and naphthalene type epoxy resins, phenol resins, urea resins, melamine resins, polyester (unsaturated polyesters) resins, polyimide resins, silicone resins and polyurethane resins. One of them, or a mixture of two or more of them may be used.

The epoxy resins, phenol resins, polyimideresins and silicone resins are preferable, and the epoxy resins are particularly preferable from the point of excellent molding ability, high mechanical strength and good heat resistance. These heat curable resins are also excellent in compatibility for kneading and uniformity of kneading.

The heat curable resins (when not cured) may be in a liquid state or in a solid state (a powder) at room temperature.

The bonded magnet according to the present invention is manufactur for example, as follows. A magnet composition (a compound) containing a magnetic powder, bonding resin and an additive (an antioxidant and a lubricant), if necessary, is manufactured. Then, the bonded magnet composition is formed into a desired magnet shape by compression molding (press molding), extrusion molding or injection molding without applying any magnetic field. The bonded magnet is cured by heating after molding, when a heat curable resin is used for the bonding resin.

While the extrusion molding and injection molding (in particular the injection molding) have such advantages as wide degree of freedom in selecting the shape and high productivity, sufficient fluidity of the compound in the molding machine should be secured in these molding methods in order to obtain a good molding ability. Consequently, the content of the magnetic powder cannot be increased, or the bonded magnet cannot be made with high density, as compared with the bonded magnet formed by compression molding. However, the bonded magnet manufactured by the extrusion molding and injection molding is able to utilize the advantages of the molding method, because a high magnetic flux density is obtained in the present invention as will be described hereinafter to consequently obtain excellent magnetic characteristics without making the bonded magnet high in density.

While the extrusion molding and injection molding (in particular the injection molding) have such advantages as wide degree of freedom in selecting the shape and high productivity, sufficient fluidity of the compound in the molding machine should be secured in these molding methods in order to obtain a good molding ability. Consequently, the content of the magnetic powder cannot be increased, or the bonded magnet cannot be made to be high density, as compared with the bonded magnet formed by compression molding. However, the bonded magnet manufactured by the extrusion molding and injection molding is able to utilize the advantages of the molding method, because a high magnetic flux density is obtained in the present invention as will be described hereinafter to consequently obtain excellent magnetic characteristics without making the bonded magnet high density.

The content (composition ratio) of the magnetic powder in the bonded magnet is not particularly restricted, but it is usually determined considering compatibility among the molding method, molding ability and high magnetic characteristics. Actually, the content is preferably about 75 to 99.5% by weight, and more preferably about 85 to 97.5% by weight.

It is preferable that the content of the magnetic powder is about 90 to 99.5% by weight, more preferably about 93 to 98.5% by weight, when the bonded magnet is manufactured by compression molding.

It is preferable that the content of the magnetic powder is about 75 to 98% by weight, more preferably about 85 to 97% by weight, when the bonded magnet is manufactured by extrusion molding or injection molding.

The density $\rho$ of the bonded magnet is determined by the factors such as specific gravity of the magnetic powder contained therein, the content of the magnetic powder and void ratio. While the density $\rho$ is not particularly restricted in the bonded magnet according to the present invention, it is preferably about 5.3 to 6.6 g/cm3, and more preferably 5.5 to 6.4 g/cm3.

High magnetic characteristics (in particular high magnetic energy product and high coercive force) can be obtained in the present invention not only when the bonded magnet contains a large quantity of the magnetic powder, but also when the content is relatively small, because the magnetic powder has a large magnetic flux density and coercive force.

The shape of the bonded magnet is not particularly restricted, but various shapes such as a round column, rectangular column, cylinder (ring), circle, plate and warped plate are possible. Large to small sizes are also acceptable. It is often described in this specification that the magnetic powder according to the present invention is advantageous for a small or super-fine magnet.

The bonded magnet according to the present invention preferably has a coercive force (specific coercive force at room temperature) HcJ of about 320 to 720 kA/m, more preferably about 400 to 640 kA/m. Demagnetization when an inverse magnetic field is applied becomes evident depending on the application field of the motor besides showing deterioration of heat resistance at a high temperature, when the coercive force is less than the lower limit described above. A coercive force exceeding the upper limit above makes magnetization ability decrease. Accordingly, good magnetization becomes possible even when a magnetization magnetic field sufficient for magnetizing the bonded magnet (particularly a cylindrical magnet) as a multipolar magnet cannot be obtained, by adjusting the coercive force HcJ within the range described above. Consequently, a sufficient amount of the magnetic flux density is obtained to enable a high performance bonded magnet, in particular a bonded magnet for use in a motor, to be provided.

The bonded magnet according to the present invention preferably has a maximum magnetic energy product (BH) max of 60 kJ/m3, more preferably 65 kJ/m3 and most preferably 70 to 130 kJ/m3. When the maximum magnetic energy product (BH)max is less than 60 kJ/m3, a sufficient torque cannot be obtained when the bonded magnet is used for a motor depending on the kind and structure of the motor.

The bonded magnet according to the present invention preferably has an absolute value of the irreversible flux loss (initial flux loss) of 5.7% or less, more preferably 3.2% or less. The flux loss described above permits a bonded magnet excellent in heat stability (heat resistance) to be obtained.

The shape of the bonded magnet is not particularly restricted, but any shape including a round column, rectangular column, cylinder (ring), circle, plate and warped plate may be acceptable. Any size of large to small sizes are possible.

It is preferable from the descriptions above that the bonded magnet according to the present invention is used for multipolar magnetization, or magnetized into a multipolar magnet.

EXAMPLE 1

A quenched ribbon (ribbon shaped magnet material) with an alloy composition of (Nd0.7Pr0.25Dy.05)8.7 Febal. Co7.0B5.6Al0.5 (referred as "composition A" hereinafter) was obtained by the method described below.

At first, each starting material of Nd, Pr, Dy, Fe, Co, B, and Al was weighed, and a mother alloy ingot was cast from the starting materials. A sample piece with a weight of about 15 g was cut from the ingot.

The quenching type ribbon manufacturing apparatus as shown in FIGS. 4 and 5 was prepared, and the sample piece was placed in a quartz tube having a nozzle (an orifice comprising a circular hole) at the bottom. After evacuating the chamber housing the quenching type ribbon manufacturing apparatus 1, an inert gas was introduced into the chamber to adjust the atmosphere to a desired temperature and pressure.

The cooling roll 5 (roll radius: 100 mm) used was provided with a surface layer 52 comprising Al2O3 with a mean thickness of 8 $\mu$m formed by sputtering on the outer circumference of a copper base 51.

The ingot sample in the quartz tube was melted thereafter by induction heating, and the molten liquid was ejected onto the circumference face of the cooling roll by adjusting the ejection pressure of the molten liquid (the differential pressure between the inner pressure of the quartz tube and the circumference pressure) to 40 kPa, thereby obtaining a quenched ribbon (mean thickness: about 30 $\mu$m, mean width: about 2 mm).

Five kinds of quenched ribbon samples No. 1 to 5 were manufactured by changing the circumference speed of the cooling roll from 10 to 22 m/sec, besides changing the atmospheric pressure in the chamber from 13 to 75 kPa.

The roll contact surfaces and free surfaces of the quenched ribbons obtained were analyzed by X-ray diffraction using a diffractometer. Cu was used as the X-ray target. The X-ray wavelength ($\lambda$) for the measurements was 0.154 nm. A monochrometer was used for the measurement, and X-ray diffraction data were obtained at a diffraction angle (2θ) in the range between 20° and 60°.

A R2(Fe·Co)14B1 type phase as a hard magnetic phase and an α-(Fe, Co)type phase as a soft magnetic phase were confirmed from the diffraction peaks in the experiment. It was also confirmed from observations with a transmission electron microscope (TEM) that these phases form nano-composite structure.

After eliminating backgrounds from the X-ray profiles obtained, diffraction angles (2θ) and half widths β were determined from the diffraction peak from the (224) face of the hard magnetic phase and diffraction peak from the (110) face of the soft magnetic phase, respectively. The crystal grain sizes D1s, D1h, D2s and D2h were calculated by substituting 2θ and β in the equation [5] with the measured values.

The ratios of D1s/D1h, D2s/D2h, D1h/D2h and D1s/D2s were determined from the calculated values. The results are shown in TABLE 1.

The samples with the sample Nos. 1 to 4 correspond to the examples according to the present invention, and the sample with the sample No. 5 corresponds to a comparative example. The values of D1s, D1h, D2s and D2h were 50 nm or less, except the sample No. 5.

Magnetic characteristics (coercive force HcJ and magnetic energy product (BH)max) of the hard magnetic phase and soft magnetic phase, respectively, were measured with respect to the samples in the sample Nos. 1 to 5 using a vibration sample type magnetometer (VSM). No demagnetization correction was applied to the measured values. The results of the measurements are also shown in TABLE 1.

TABLE 1 clearly shows that, while all the samples with the sample Nos. 1 to 4 as the quenched ribbon according to the present invention exhibit excellent magnetic characteristics (HcJ and (BH)max), the sample with a sample No. 5 as a comparative example has poor magnetic characteristics.

EXAMPLE 2

After crushing the quenched ribbons in the sample Nos. 1 to 5, magnetic powders with the composition A were obtained by applying a heat treatment in an Ar atmosphere at 700° C. for 300 seconds.

For adjusting the grain size, the magnetic powders were additionally crushed using a crusher in argon gas to a mean particle size of 40 μm.

Bonded magnet compositions (compounds) were manufactured by mixing these magnetic powders with an epoxy resin (a binder resin) and a hydrazine based antioxidant, followed by kneading.

Then, the compounds were crushed into granules, which were weighed and filled into a die of a press machine. Molded bodies were obtained by a compression molding (without applying a magnetic field) under a pressure of 7 tons/cm2.

After releasing from the die, isotropic rare earth bonded magnets with a diameter of 10 mm and a height of 7 mm were obtained by curing the epoxy resin (cure treatment) with heating. The content of the magnetic powder in each bonded magnet was 98.0% by weight, and the density ρ was 6.2 g/cm3.

Irreversible flux loss (initial flux loss) of the five kinds of the bonded magnets obtained were measured by returning the environmental temperature to room temperature after holding in an environment at 100° C. for 1 hour. The results are shown in TABLE 2.

After pulse magnetization of the five kinds of the bonded magnets at a magnetic field strength of 3.2 MA/m, the magnetic characteristics (remanent magnetic flux density Br, coercive force HcJ and maximum magnetic energy product (BH)max) were measured at a maximum applied magnetic field of 2.0 MA/m using a direct current recording magnetic flux meter. The measuring temperature was 23° C. The results are shown in TABLE 2.

The irreversible flux loss (initial flux loss) was measured for each bonded magnet by returning the environmental temperature to room temperature after holding the bonded magnet in an environment at a temperature of 100° C. for 1 hour. The results are shown in TABLE 2.

TABLE 2 clearly shows that all the bonded magnets obtained from the magnet materials with the sample Nos. 1 to 4 exhibit excellent magnetic characteristics (Br, HcJ and (BH)max), besides having an absolute value of the irreversible flux loss of as low as 5.0% and being excellent in heat stability (heat resistance).

The bonded magnet obtained from the magnet material with the sample No. 5 as a comparative example is inferior in magnetic properties and has an absolute value of the irreversible flux loss of as low as −5.9%, in addition to a low heat stability.

EXAMPLE 3

Cylindrical (ring shaped) isotropic rare earth bonds magnets with an outer diameter of 22 mm, an inner diameter of 20 mm and a height of 4 mm were manufactured from the magnet materials with the sample Nos. 1 to 5, and the bonded magnets obtained were magnetized into octapole magnets. The current flowed through the magnetization coil was 16 kA.

The magnetization magnetic field strength required for attaining a magnetization rate of 90% was relatively small, resulting in good magnetization.

Spindle motors for CD-ROM were assembled using the bonded magnets magnetized as described above as rotor magnets.

Back electromotive force generated in the coil for rotating the rotor at 1000 rpm in the spindle motor for CD-ROM was measured. The result showed that, while the voltage of the motor using the bonded magnet in the sample No. 5 was 0.80V, the motors using the bonded magnets the sample Nos. 1 to 4 was as high as 0.96V that is by 20% or more higher than that in the motor above.

It was confirmed from the results that a high performance motor can be manufactured using the bonded magnet according to the present invention.

The same results as described above were obtained, when a bonded magnet and a motor according to the present invention was manufactured by the same method as used in Examples 1 to 3 and their performances were evaluated, except that the bonded magnet was manufactured by extrusion molding.

The same results as described above were also obtained, when a bonded magnet and a motor according to the present invention was manufactured by the same method as used in Examples 1 to 3 and their performances were evaluated, except that the bonded magnet was manufactured by injection molding.

As hitherto described, the following effects are obtained by the present invention.

Since the magnet material assumes a composite microstructure comprising a soft magnetic phase and hard magnetic phase with uniform properties and characteristics, a high magnetization and excellent magnetic characteristics can be obtained. In particular, coercive force and squareness ratio of the magnet material can be also improved.

The magnet material has a small absolute value of the irreversible flux loss as well as an excellent heat stability (heat resistance).

Since the magnet material has a high magnetic flux density, an isotropic bonded magnet having high magnetic characteristics can be obtained. A smaller motor with higher performance can be obtained, since the bonded magnet can exhibit magnetic characteristics equal to or higher than those in the conventional isotropic bonded magnets.

Sufficiently high magnetic characteristics can be obtained without attempting to manufacture a highly compacted bonded magnet, since the magnet material has a high magnetic flux density. Consequently, molding ability as well as dimensional accuracy, mechanical strength, corrosion resistance and heat stability may be improved to enable a highly reliable bonded magnet to be readily manufactured.

A good magnetization property enables the bonded magnet to be magnetized at a lower magnetization magnetic field, besides allowing a high magnetic flux density to be obtained.

The method according to the present invention is suitable for manufacturing the bonded magnet by an extrusion molding method and injection molding method that have been difficult to mold a high density magnet as compared with the compression molding method. The bonded magnet manufactured by the molding methods above can also exhibit the same effect as hitherto described. Consequently, the selection range of the method for molding the bonded magnet, and the degree of freedom for selecting the shape by using the molding method may be expanded.

INDUSTRIAL APPLICABILITY

The bonded magnet according to the present invention can be applied for compact and high performance motors.

TABLE 1

(QUENCHED RIBBON)

| SAMPLE No. | D1s/D1h | D2s/D2h | D1h/D2h | D1s/D2s | $H_{cJ}$ [kA/m] | $(BH)_{max}$ [kJ/m³] |
|---|---|---|---|---|---|---|
| 1 | 0.82 | 0.75 | 0.88 | 0.96 | 554.2 | 155.0 |
| 2 | 0.78 | 0.69 | 0.76 | 0.85 | 561.5 | 153.6 |
| 3 | 0.72 | 0.64 | 0.68 | 0.77 | 530.8 | 147.2 |
| 4 | 0.63 | 0.56 | 0.58 | 0.65 | 502.7 | 139.4 |
| 5 | 0.92 | 0.86 | 0.45 | 0.48 | 365.2 | 97.9 |

TABLE 2

(BONDED MAGNET)

| SAMPLE No. | Br [T] | HcJ [kA/m] | (BH)max [kJ/m3] | IRREVERSIBLE FLUX LOSS [%] |
|---|---|---|---|---|
| 1 | 0.87 | 553.6 | 107.2 | −2.7 |
| 2 | 0.85 | 560.2 | 106.3 | −3.0 |
| 3 | 0.82 | 529.7 | 101.9 | −3.9 |
| 4 | 0.79 | 501.9 | 96.5 | −5.0 |
| 5 | 0.71 | 363.2 | 59.8 | −5.9 |

What is claimed is:

1. A ribbon shaped magnet material obtained by allowing a molten liquid of an alloy containing at least one rare earth element and at least one transition metal to contact a cooling member, the microstructure of the ribon shaped magnetic material comprising:

a composite microstructure having a soft magnetic phase and hard magnetic phase, wherein D1h, D1s, D2h and D2s satisfy the following equations:

$$D1s/D1h \leq 0.9 \quad (1)$$

$$D2s/D2h \leq 0.8 \quad (2)$$

where D1h denotes a mean grain size of the hard magnetic phase near a first surface which has been in contact with the cooling member, D1s denotes a mean grain size of the soft magnetic phase near the first surface, D2h denotes a mean grain size of the hard magnetic phase near a second surface opposed to the first surface, and D2s denotes a mean grain size of the soft magnetic phase near the second surface.

2. A ribbon shaped magnet material according to claim 1 satisfying at least one of the equations [3] and [4]:

$$0.5 \leq D1h/D2h \leq 1 \quad [3]$$

$$0.5 \leq D1s/D2s \leq 1 \quad [4]$$

3. A ribbon shaped magnet material obtained by allowing a molten liquid of an alloy containing rare earth elements and transition metals to contact a cooling member, the microstructure of the ribbon shaped magnetic material comprising:

a composite microstructure having a soft magnetic phase and hard magnetic phase, wherein D1h, D1s, D2h and D2s satisfy the following equations:

$$0.5 \leq D1h/D2h \leq 1 \quad (3)$$

$$0.5 \leq D1s/D2s \leq 1 \quad (4)$$

where D1h denotes a mean grain size of the hard magnetic phase near a first surface which has been in contact with the cooling member, D1s denotes a mean grain size of the soft magnetic phase near the first surface, D2h denotes a mean grain size of the hard magnetic phase near a second surface opposed to the first surface, and D2s denotes a mean grain size of the soft magnetic phase near the second surface.

4. A ribbon shaped magnet material according to claim 1, wherein at least one of D1s and D2s is 75 nm or less.

5. A ribbon shaped magnet material according to claim 1, wherein at least one of D1h and D2h is 75 nm or less.

6. A ribbon shaped magnet material according to claim 1, wherein D1h, D2h, D1s and D2s are determined by X-ray diffraction.

7. A ribbon shaped magnet material according to claim 1 containing B (boron) in the alloy composition.

8. A ribbon shaped magnet material according to claim 1 containing Al (aluminum) in the alloy composition.

9. A ribbon shaped magnet material according to claim 1, wherein the alloy composition is represented by $R_x(Fe_{1-y}Co_y)_{100-x-z-w}B_zAl_w$ (wherein R denotes at least one rare earth element, and x is in a range of 7.1 to 9.9 atomic percentage (at %), y is in a range of 0 to 0.30 at %, z is in a range of 4.6 to 6.8 at %, and w is in a range of 0.02 to 1.5 at %).

10. A ribbon shaped magnet material according to claim 9, wherein R is a rare earth element mainly comprising Nd and/or Pr.

11. A ribbon shaped magnet material according to claim 9, wherein R includes Pr with a proportion of 5 to 75% relative to a total content of R.

12. A ribbon shaped magnet material according to claim 9, wherein R includes Dy with a proportion of 14% or less relative to a total content of R.

13. A ribbon shaped magnet material according to claim 1, which has been subjected to a heat treatment after contacting the cooling member.

14. A ribbon shaped magnet material according to claim 1, wherein the cooling member is a cooling roll.

15. A magnetic powder having been obtained by pulverizing the ribbon shaped magnet material according to claim 1.

16. A magnetic powder according to claim 1 which has been subjected to at least one heat treatment in its manufacturing process or after manufacturing.

17. A magnetic powder according to claim 15 having a mean particle size of 0.5 to 150 μm.

18. A rare earth bonded magnet having been prepared by bonding the magnetic powder according to claim 15 with a bond resin.

19. A rare earth bonded magnet according to claim 18 containing 75 to 95.5 wt % of the magnetic powder.

20. A rare earth bonded magnet according to claim 15 having a coercive force of 320 to 720 kA/m.

21. A rare earth bonded magnet according to claim 18 having a magnetic energy product $(BH)_{max}$ of 60 kJ/m².

22. A rare earth bonded magnet according to claim 18 having an absolute value of the irreversible flux loss (initial flux loss) of 5.7% or less.

23. A rare earth bonded magnet according to claim 18 which has been subjected to magnetization or magnetized as a multipolar magnet.

24. A rare earth bonded magnet according to claim 18 in a motor.

25. A ribbon shaped magnet material according to claim 3, wherein at least one of D1s and D2s is 75 nm or less.

26. A ribbon shaped magnet material according to claim 3, wherein at least one of D1h and D2h is 75 nm or less.

27. A ribbon shaped magnet material according to claim 3, wherein D1h, D2h, D1s and D2s are determined by X-ray diffraction.

28. A ribbon shaped magnet material according to claim 3 containing B (boron) in the alloy composition.

29. A ribbon shaped magnet material according to claim 3 containing Al (aluminum) in the alloy composition.

30. A ribbon shaped magnet material according to claim 3, wherein the alloy composition is represented by $R_x(Fe_{1-y}Co_y)_{100-x-z-w}B_zAl_w$ (wherein R denotes at least one rare earth element, and x is in a range of 7.1 to 9.9 atomic percentage (at %), y is in a range of 0 to 0.30 at %, z is in a range of 4.6 to 6.8 at %, and w is in a range of 0.02 to 1.5 at %).

31. A ribbon shaped magnet material according to claim 30, wherein R is a rare earth element mainly comprising Nd and/or Pr.

32. A ribbon shaped magnet material according to claim 30, wherein R includes Pr with a proportion of 5 to 75% relative to a total content of R.

33. A ribbon shaped magnet material according to claim 30, wherein R includes Dy with a proportion of 14% or less relative to a total content of R.

34. A ribbon shaped magnet material according to claim 3 which has been subjected to a heat treatment after contacting the cooling member.

35. A ribbon shaped magnet material according to claim 3, wherein the cooling member is a cooling roll.

36. A magnetic powder having been obtained by pulverizing the ribbon shaped magnet material according to claim 3.

37. A magnetic powder according to claim 3 which has been subjected to at least one heat treatment in its manufacturing process or after manufacturing.

38. A magnetic powder according to claim 36 having a mean particle size of 0.5 to 150 μm.

39. A rare earth bonded magnet having been prepared by bonding the magnetic powder according to claim 36 with a bond resin.

40. A rare earth bonded magnet according to claim 39 containing 75 to 95.5 wt % of the magnetic powder.

41. A rare earth bonded magnet according to claim 39 having a coercive force of 320 to 720 kA/m.

42. A rare earth bonded magnet according to claim 39 having a magnetic energy product $(BH)_{max}$ of 60 kJ/m².

43. A rare earth bonded magnet according to claim 39 having an absolute value of the irreversible flux loss (initial flux loss) of 5.7% or less.

44. A rare earth bonded magnet according to claim 39 subjected to multipolar magnetization or magnetized as a multipolar magnet.

45. A rare earth bonded magnet according to claim 39 in a motor.

* * * * *

UNITED STATES PATENT AND TRADEMARK OFFICE
CERTIFICATE OF CORRECTION

PATENT NO. : 6,478,891 B1
DATED : November 12, 2002
INVENTOR(S) : Arai et al.

It is certified that error appears in the above-identified patent and that said Letters Patent is hereby corrected as shown below:

<u>Title page,</u>
Item [86], "§371 Filing Date" "Jan. 2, 2002" should be -- July 24, 2001 --

<u>Column 4,</u>
Line 9, "bases" should be -- based --

<u>Column 5,</u>
Line 27, "fexis" should be -- exist --

<u>Column 8,</u>
Line 30, "<" should be -- ≥ --

<u>Column 10,</u>
Line 33, "polyimideresins" should be -- polyimide resins --
Line 43, "manufactur" should be -- manufactured --

<u>Column 11,</u>
Lines 1-16, delete entire paragraph

<u>Column 14,</u>
Line 24, "bonds" should be -- bonded --
Line 42, after "magnets" insert -- in --

<u>Column 17,</u>
Line 25, "claim 15" should be -- claim 18 --
Line 33, before "magnetization" insert -- multipolar --

Signed and Sealed this

Nineteenth Day of August, 2003

JAMES E. ROGAN
*Director of the United States Patent and Trademark Office*